United States Patent
Minamiura

(10) Patent No.: US 10,289,083 B2
(45) Date of Patent: May 14, 2019

(54) CONTROL DEVICE, STORAGE DEVICE, AND CONTROL METHOD

(71) Applicant: FUJITSU LIMITED, Kawasaki-shi, Kanagawa (JP)

(72) Inventor: Kiyoto Minamiura, Koto (JP)

(73) Assignee: FUJITSU LIMITED, Kawasaki (JP)

( * ) Notice: Subject to any disclaimer, the term of this patent is extended or adjusted under 35 U.S.C. 154(b) by 531 days.

(21) Appl. No.: 14/946,592

(22) Filed: Nov. 19, 2015

(65) Prior Publication Data

US 2016/0195863 A1    Jul. 7, 2016

(30) Foreign Application Priority Data

Jan. 6, 2015  (JP) ................................. 2015-000880

(51) Int. Cl.

| G05B 15/02 | (2006.01) |
|---|---|
| G06F 1/26 | (2006.01) |
| G06F 3/06 | (2006.01) |
| G06F 1/3234 | (2019.01) |

(52) U.S. Cl.
CPC .............. *G05B 15/02* (2013.01); *G06F 1/26* (2013.01); *G06F 1/3268* (2013.01); *G06F 3/0625* (2013.01); *Y02D 10/154* (2018.01)

(58) Field of Classification Search
CPC ......... G05B 15/02; G06F 1/26; G06F 1/3268; G06F 3/0625; G06F 12/00; G06F 1/3203; Y02D 10/154
USPC .................................................... 700/2, 280
See application file for complete search history.

(56) References Cited

U.S. PATENT DOCUMENTS

| 6,583,947 B1* | 6/2003 | Hakamata ............. G06F 1/3221 360/69 |
|---|---|---|
| 2001/0011357 A1* | 8/2001 | Mori ........................ H04L 1/24 714/25 |
| 2004/0153914 A1* | 8/2004 | El-Batal ................. G11C 29/02 714/724 |
| 2006/0236028 A1* | 10/2006 | Tanaka .................. G06F 3/0613 711/112 |
| 2008/0126701 A1 | 5/2008 | Uehara et al. |
| 2008/0201593 A1 | 8/2008 | Hori et al. |
| 2008/0204920 A1* | 8/2008 | Muramatsu .......... G11B 17/228 360/71 |

FOREIGN PATENT DOCUMENTS

| JP | 2008-134830 | 6/2008 |
|---|---|---|
| JP | 2008-203951 | 9/2008 |

* cited by examiner

Primary Examiner — Dzung Tran
(74) Attorney, Agent, or Firm — Fujitsu Patent Center

(57) ABSTRACT

A control device includes: a memory; and a processor, coupled to the memory, configured to perform operations to: obtain a first control right that is an exclusive right used to control a first memory device and first memory device information on a configuration of the first memory device, from another control device having the first control right when an operation suspend instruction to the another control device occurs; give back the first control right to the another control device after obtaining the first control right and the first memory device information; and conduct a first access test of the first memory device after giving back the first control right.

8 Claims, 4 Drawing Sheets

CONTROL DEVICE, STORAGE DEVICE, AND CONTROL METHOD

CROSS-REFERENCE TO RELATED APPLICATION

This application is based upon and claims the benefit of priority of the prior Japanese Patent Application No. 2015-000880, filed on Jan. 6, 2015, the entire contents of which are incorporated herein by reference.

FIELD

The embodiments discussed herein are related to a control device, a storage device, and a control method.

BACKGROUND

In the use of cloud and big data in an information processing system, the number of storage devices included in the information processing system has been increasing.

A technology in a related art is discussed in Japanese Laid-open Patent Publication No. 2008-203951 and Japanese Laid-open Patent Publication No. 2008-134830.

SUMMARY

According to an aspect of the embodiments, a control device includes: a memory; and a processor, coupled to the memory, configured to perform operations to: obtain a first control right that is an exclusive right used to control a first memory device and first memory device information on a configuration of the first memory device, from another control device having the first control right when an operation suspend instruction to the another control device occurs; give back the first control right to the another control device after obtaining the first control right and the first memory device information; and conduct a first access test of the first memory device after giving back the first control right.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
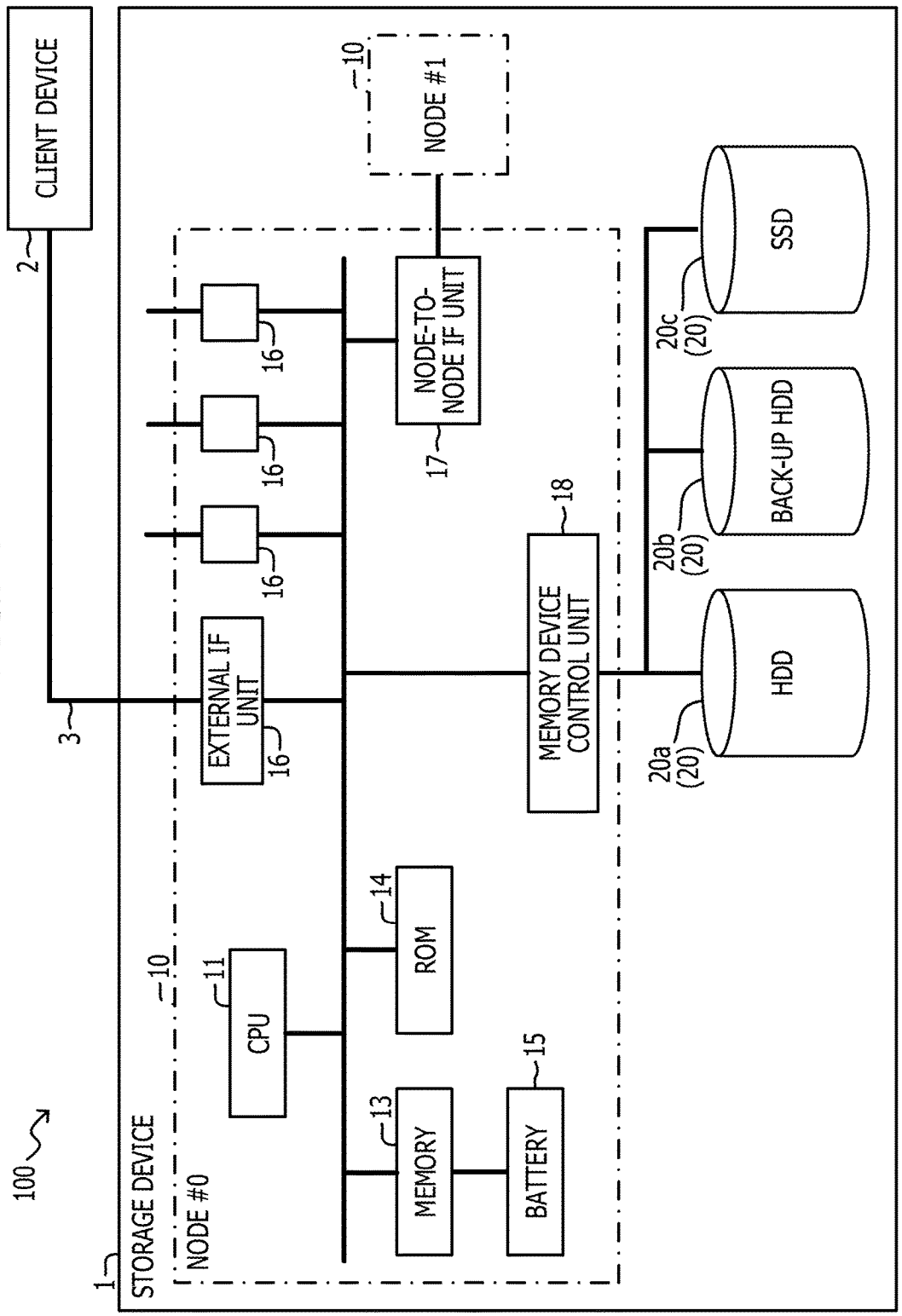
FIG. 1 illustrates an example of a function configuration of a storage system.

A reduction in electrical energy consumed in households and companies is desired, and power conservation in a data center and the like in which a large number of storage devices are installed is also desired.

The access sources to the data center are across a number of companies and countries, so that the data accesses may be concentrated or may not be concentrated depending on a time zone. For example, in the time zone in which the data accesses are not concentrated, the power consumption is reduced by temporarily decreasing the performance and the function of some of the storage devices included in the information processing system.

With high performance of a storage device, the capacity of a program and an operating system (OS) used to control the storage device is increased. Therefore, times taken for reading the OS and the program at the time of application of a power source, deploying the program and the OS to a memory, and calculation become long, so that the startup time of the entire storage device becomes long. Data on a cache is optimized at the time of operation of the storage device. Therefore, when a request for the function or the performance of the storage device on which the power source cutting has been performed for execution of power conservation occurs, the optimization state on the cache may be lost.

In order to achieve the power conservation and reduce the startup time, a power source maintaining portion (including a central processing unit (CPU) and a memory/cache) and a power source cutting portion (including a disk and the like) are provided separately in the storage device. For example, power supply to the power source cutting portion is suspended, and power supply to the power source cutting unit is resumed as appropriate (suspend/resume control).

In the suspend/resume control, an area of a certain address is secured on a memory included in the storage device, and control information and an address pointer of a register for the suspend/resume control in the hardware are stored in the area. The suspend/resume operation in the hardware, the area on the memory, and the hardware register is different from the normal operation of the storage device, and it may be difficult to detect a failure of the suspend/resume operation in the normal operation. For example, in a storage device including two nodes A and B, a failure that has occurred in a suspend processing unit or a suspend management part of a memory, a non-volatile random access memory (NVRAM), hardware, or the like of the node A may not be detected at the time of resume processing after the suspend processing. Due to delay of detection of the failure, the nodes A and B may not become the active state, and one of the nodes may become a degeneration state. Therefore, the storage device may not satisfy the performance that has been requested immediately after the resumption.

In addition to the illustrated configuration elements, a further configuration element, a further function, and the like, may be included in the drawings.

In the following description, the same symbol indicates a similar portion in the drawings, so that the duplicated description may be omitted or reduced. FIG. 1 illustrates an example of a function configuration of a storage system.

The storage system 100 illustrated in FIG. 1 is provided, for example, in a data center, and may provide a memory area for a client device 2. The storage system 100 may include a storage device 1 and the client device 2. The storage device 1 and the client device 2 are coupled to each other, for example, through a local area network (LAN) 3. The client device 2 may be, for example, a personal computer (PC). The storage system 100 illustrated in FIG. 1 includes a single client device 2, but the number of the client devices 2 included in the storage system 100 may be changed.

A plurality of memory devices 20 is installed in the storage device 1. The storage device 1 may be a device that provides a memory area to the client device 2. The storage device 1 distributes data to the plurality of memory devices 20, for example, using redundant arrays of inexpensive disks (RAID), and stores the data in a redundant state. The storage device 1 may be, for example, a network attached storage (NAS) device or a storage area network (SAN) device.

For example, the storage device 1 may include a cluster configuration of an Active-Active scheme, in order to satisfy a request of high-performance/high-reliability. In the cluster configuration, in order to meet the demands of high-reliability desired for the storage device 1, two or more nodes 10, for example, a control device, a first control device, and a second control device are configured as a single unit. As a result, when a failure occurs in a node 10, a function included in the failed node 10 is taken over by a normal node 10, and the availability of the storage device 1 is increased. The cluster configuration is also called a high-availability (HA) configuration, and is used, for example, to build a server. The cluster configuration may be made by three or more nodes 10, but such a configuration causes complication of connection between the nodes, an increase in cost, or complication of the control, so that, for example, two nodes 10 may be used as a single unit, and one or a plurality of such units may be provided in the storage device.

In FIG. 1, the two nodes 10 are provided in an identical housing (storage device 1), but the two nodes 10 may be respectively provided in different housings (storage devices 1). In the Active-Active scheme, in order to meet the demands of high performance desired for the storage device 1, both of the two nodes having the cluster configuration are operated in the normal state.

The storage device 1 has the cluster configuration using two nodes as a single unit. Taking-over of the function from the one of the nodes 10 to the other node 10, which is performed by an obtaining unit 112 and a response unit 117 illustrated in FIG. 2, may be referred to as "Takeover". In addition, giving-back of the taken-over function, which is performed by a giveback unit 113 and a reception unit 118 illustrated in FIG. 2, may be referred to as "Giveback".

As illustrated in FIG. 1, the storage device 1 includes the two nodes (node #0 and #1) 10 and the one or a plurality of (three in FIG. 1) memory devices 20. Hereinafter, when a single node is to be identified from among the plurality of nodes, the node is referred to as "node #0" or "node #1", and a certain node is referred to as "node 10".

The memory device 20 may be a known device that stores data so that reading and writing of the data is enabled to be performed. In FIG. 1, the storage device 1 includes a hard disk drive (HDD) 20a, a back-up HDD 20b, and a solid state drive (SSD) 20c, as the memory devices 20. The HDD 20a stores data in response to a storage access request from the client device 2 (access control signal, and hereinafter, referred to as a host I/O).

The back-up HDD 20b stores a copy of the data stored in the HDD 20a, as back-up data. The SSD 20c temporarily stores the data of the HDD 20a. The SSD 20c may function as a write cache. The node 10 may be a control device that performs various pieces of control, and performs the various pieces of control in accordance with the host I/O from the client device 2. The nodes #0 and #1 may have a similar configuration, so that, the function configuration included in the node #0 is illustrated in FIG. 1, and the function configuration included in the node #1 is omitted for the sake of simplicity.

The node 10 includes a CPU (computer) 11, a memory 13, a read only memory (ROM) 14, a battery 15, one or a plurality of (four in FIG. 1) external interface (IF) units 16, a node-to-node IF unit 17, and a memory device control unit 18. The external IF unit 16 is an interface controller that couples the node 10 to the client device 2 so that the node 10 and the client device 2 are allowed to communicate with each other. The external IF unit 16 is, for example, an Ethernet (registered trademark) interface that couples the node 10 to the LAN 3.

The node-to-node IF unit 17 is an interface used to access the other node 10 at the time of configuration of the cluster of the storage device 1, and for example, may be a Fibre Channel (FC) adapter. The memory device control unit 18 is an interface that performs read/write control of data for each of the memory devices 20 and control of transfer of a file that has been read from the memory device 20, to a bus inside of the node 10, and for example, may be a FC adapter.

The memory 13 may be a random access memory (RAM), and is used as a primary record memory or a working memory. The memory 13 temporarily stores data transferred between the LAN 3 and the memory device control unit 18, through the external IF unit 16. The battery 15 is a device used to protect the data stored in the memory 13 that is a volatile memory device, by supplying a back-up power source to the memory 13 at the time of power source cutting for the node 10.

Figure 2:
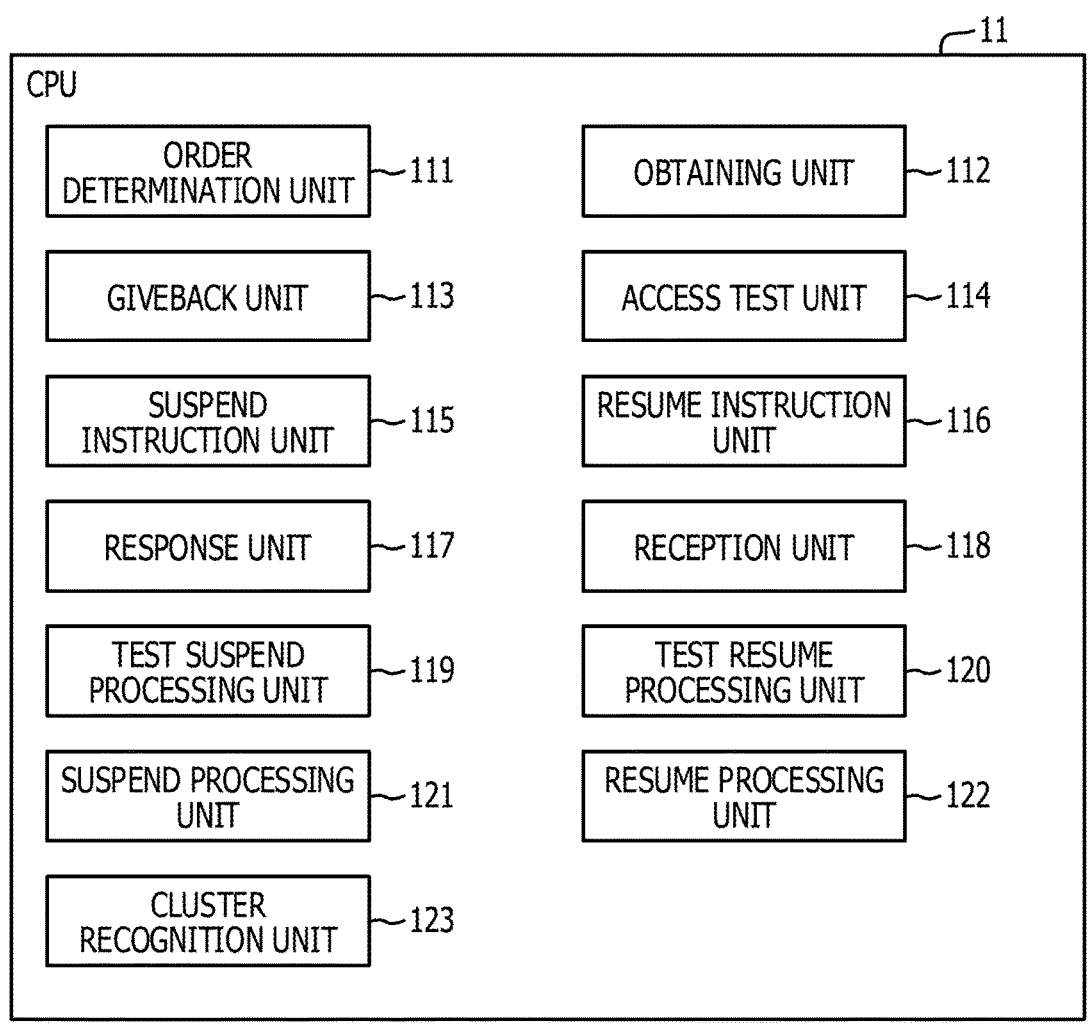
FIG. 2 illustrates an example of a function configuration of a CPU.

For example, a program such as a Basic Input/Output System (BIOS) is recorded to the ROM 14. A software program on the ROM 14 is read and executed by the CPU 11 as appropriate. FIG. 2 illustrates an example of a function configuration of a CPU. The CPU illustrated in FIG. 2 may be included in the node (control device) of the storage system.

The CPU 11 is a processing device that performs various pieces of control and calculation, and achieves various functions by executing an OS stored in the memory 13, for example, the ONTAP (registered trademark) and a program. For example, as illustrated in FIG. 2, the CPU 11 may function as an order determination unit 111, the obtaining unit 112, the giveback unit 113, an access test unit 114, a suspend instruction unit 115, a resume instruction unit 116, the response unit 117, the reception unit 118, a test suspend processing unit 119, a test resume processing unit 120, a suspend processing unit 121, a resume processing unit 122, and a cluster recognition unit 123.

Programs (control programs) that achieve the functions as the order determination unit 111, the obtaining unit 112, the giveback unit 113, the access test unit 114, the suspend instruction unit 115, the resume instruction unit 116, the response unit 117, the reception unit 118, the test suspend processing unit 119, the test resume processing unit 120, the suspend processing unit 121, the resume processing unit 122, and the cluster recognition unit 123 may be provided in a form in which the programs are recorded to, for example, a computer-readable recording medium such as a flexible disk, a compact disk (CD) (including CD-ROM, CD-R, CD-RW, or the like), a digital versatile disk (DVD) (including DVD-ROM, DVD-RAM, DVD-R, DVD+R, DVD-RW, DVD+RW, HD-DVD, or the like), a Blu-ray disk, a magnetic disk, an optical disk, or a magneto-optical disk. The computer, in order to use the programs, reads the programs from the recording medium through a reading device, transfer the programs to an internal recording device or an external recording device, and store the programs. The programs may be recorded, for example, to a memory device (recording medium) such as a magnetic disk, an optical disk, or a magneto-optical disk, and provided to the computer from the memory device through a communication path.

When the functions as the order determination unit 111, the obtaining unit 112, the giveback unit 113, the access test unit 114, the suspend instruction unit 115, the resume instruction unit 116, the response unit 117, the reception unit 118, the test suspend processing unit 119, the test resume processing unit 120, the suspend processing unit 121, the resume processing unit 122, and the cluster recognition unit 123 are achieved, the programs stored in the internal memory device, for example, the ROM 14 are executed by a microprocessor of the computer, for example, the CPU 11. At that time, the programs recorded to the recording medium may be read and executed by the computer.

For example, when the node 10 included in the storage device 1 becomes the suspended state regularly, the power conservation of the storage system 100 may be achieved. An administrator of the storage system 100 may determine a time at which suspend processing (operation suspension) is executed for the node 10 in order to achieve the power conservation of the storage system 100, based on the usage status or the like of the storage system 100. When the time of the suspend processing for the node 10 has arrived, the administrator issues a suspend instruction to one or both of the nodes 10, for example, through the client device 2. The client device 2 may automatically issue a suspend instruction to the node 10, based on the time for the suspend processing, which has been set in advance by the administrator.

For example, communication between the nodes #0 and #1 each including the CPU 11 is performed through the node-to-node IF unit 17. Hereinafter, a node 10 in which the functions as the order determination unit 111, the obtaining unit 112, the giveback unit 113, the access test unit 114, the suspend instruction unit 115, the resume instruction unit 116, the response unit 117, the reception unit 118, the test suspend processing unit 119, the test resume processing unit 120, the suspend processing unit 121, the resume processing unit 122, and the cluster recognition unit 123 are provided, may be referred to as "own node 10". In addition, a node 10 that is different from the node 10 in which the functions as the order determination unit 111, the obtaining unit 112, the giveback unit 113, the access test unit 114, the suspend instruction unit 115, the resume instruction unit 116, the response unit 117, the reception unit 118, the test suspend processing unit 119, the test resume processing unit 120, the suspend processing unit 121, the resume processing unit 122, and the cluster recognition unit 123 are provided may be referred to as "other node 10".

The suspend processing unit 121 executes the suspend processing. For example, the suspend processing unit 121 suspends some of functions included in the own node 10 after the access test unit 114 of the own node 10 has completed an access test, and the access test unit 114 of the other node 10 has completed an access test. The suspend processing unit 121 executes the suspend processing, for example, by suspending power supply to some of the functions of the own node 10 such as the memory device control unit 18 or the HDD 20a the disk ownership of which is owned by the own node 10.

The resume processing unit 122 executes the resume processing. For example, the resume processing unit 122 resumes the operations of the functions that have been suspended by the suspend processing unit 121, for example, when a resume instruction to the own node 10 occurs, for example, based on an instruction from the client device 2 after the suspend processing unit 121 has suspended the operations of some of the functions included in the own node 10. The resume processing unit 122 executes the resume processing, for example, by resuming the power supply to the functions that have been suspended by the suspend processing unit 121.

The cluster recognition unit 123 confirms that the storage device 1 corresponds to the cluster configuration of the Active-Active state after the resume processing units 122 of both of the own and other nodes 10 has completed the resume processing. The cluster recognition unit 123 confirms, for example, that communication with the other node 10 is allowed to be performed through the node-to-node IF unit 17. For example, in order that the cluster recognition unit 123 reliably confirms that the storage device 1 corresponds to the cluster configuration of the Active-Active state, the CPU 11 functions as the order determination unit 111, the obtaining unit 112, the giveback unit 113, the access test unit 114, the suspend instruction unit 115, the resume instruction unit 116, the response unit 117, the reception unit 118, the test suspend processing unit 119, and the test resume processing unit 120.

The order determination unit 111 determines the order of the nodes 10 for which the test suspend processing is executed. For example, when suspend instructions to the nodes 10 occur, the order determination unit 111 determines one of the nodes 10, for which the test suspend processing is executed first by the test suspend processing unit 119. The order determination of the test suspend processing by the order determination unit 111 may be made by a known method such as a round robin scheme or a random scheme. The CPU 11 may not have a function as the order determination unit 111 and the administrator of the storage system 100 may determine the order of the nodes 10 for which the test suspend processing is executed.

The obtaining unit 112 recognizes a configuration of the other node 10 due to the takeover processing by the other node 10. For example, when a suspend instruction to the other node 10 occurs, the obtaining unit 112 issues an obtaining request to the other node 10, obtains a disk ownership and volume information, or Common Internet File System (CIFS)/Network File System (NFS) sharing setting managed by the other node 10, from the other node 10, and for example, stores the obtained information in the memory 13. Therefore, the other node 10 becomes a self-blockage state.

The response unit 117 executes the takeover processing. For example, when a suspend instruction to the own node 10 occurs, the response unit 117 responds volume information and a disk ownership of the memory device 20 controlled by the own node 10, to the other node 10, for an obtaining request from the obtaining unit 112 of the other node 10. Therefore, the own node 10 becomes the self-blockage state.

The disk ownership is an exclusive right used to control the memory device 20 by the node 10. For example, merely the node 10 having the disk ownership may control the memory device 20. The volume information is information on the configuration of the memory device 20. The volume information may include a volume name, for example, "/vol/vol1", a protocol name, for example, "Server Message Block (SMB)/NFS", IDs of disks that constitute the volume, for example, "disk-A^E" when the volume includes five disks, read/write attribute information of the volume, or a threshold value, an increase unit, or the like of autogrow (automatic area extension). When the storage device 1 is a SAN device, the volume information includes a logical block address (LBA) of a logical unit number (LUN), in addition to these information. The two nodes 10 may share some information such as a protocol name in advance, and may not perform reception and transmission of some information such as the protocol name at the time of the takeover/giveback processing.

The obtaining unit 112 confirms that the other node 10 has completed successfully the takeover processing. When the takeover processing has not been completed successfully, the obtaining unit 112 interrupts the suspend processing of the entire cluster, and for example, notifies the administrator of the storage system 100 of the error through the client device 2. The giveback unit 113 executes the giveback processing after the other node 10 has completed the takeover processing successfully. For example, after the obtaining unit 112 have obtained the disk ownership and the volume information, the obtained disk ownership is given back by the other node 10.

The reception unit 118 receives the disk ownership given back from the other node 10 after the response unit 117 has responded the disk ownership and the volume information. For example, the reception unit 118 receives the disk ownership, based on the giveback processing by the giveback unit 113 of the other node 10. Therefore, the storage device 1 becomes the cluster configuration of the Active-Active state again.

When the giveback processing for the other node 10 has been completed successfully, the suspend instruction unit 115 issues an execution instruction of the test suspend processing, to the other node 10. For example, the suspend instruction unit 115 issues the execution instruction of the test suspend processing, to the other node 10 after the giveback unit 113 has given back the disk ownership to the other node 10. The test suspend processing unit 119 executes the test suspend processing at timing different from the other node 10 before the suspend processing unit 121 executes the suspend processing of the entire cluster. For example, in the storage device 1, the test suspend processing may be executed for the nodes 10 one by one alternately. For example, the test suspend processing unit 119 suspends the operations of some of functions included in the own node 10, in response to an execution instruction of the test suspend processing from the suspend instruction unit 115 of the other node 10 after the reception unit 118 has received the disk ownership. The test suspend processing unit 119 executes the test suspend processing, for example, by suspending power supply to the memory device control unit 18 or the HDD 20a the disk ownership of which is owned by the own node 10.

The resume instruction unit 116 issues a resume instruction to the other node 10 after the suspend instruction unit 115 has completed the test suspend processing of the other node 10 in response to the suspend instruction. For example, the resume instruction unit 116 calculates a time taken for the test suspend processing by the other node 10, using various methods, based on the volume information that has been obtained by the obtaining unit 112 due to the takeover processing from the other node 10. The various methods may include a known method. The resume instruction unit 116 issues an execution instruction of the test resume processing after the calculated time has elapsed.

The test resume processing unit 120 executes the test resume processing. For example, the test resume processing unit 120 resumes the operations of some of the functions included in the own node 10, which have been suspended by the test suspend processing unit 119, in response to an execution instruction of the test resume processing from the other node 10 after the test suspend processing unit 119 has suspended the some functions in the own node 10. The test resume processing unit 120 executes the test resume processing, for example, by resuming power supply to the functions that have been suspended by the test suspend processing unit 119.

The access test unit 114 conducts an access test for the memory device 20 the disk ownership of which is owned by the other node 10 after the suspend/resume processing for the other node 10 has been executed, for example, after it has been confirmed that the resume processing has been executed successfully. For example, the access test unit 114 conducts the access test for the memory device 20 the disk ownership of which is owned by the other node 10 after the test resume processing unit 120 of the other node 10 has completed the test resume processing in response to the test resume instruction by the resume instruction unit 116. For example, the access test unit 114 conducts the access test for the memory device 20 the disk ownership of which is owned by the other node 10 after the giveback unit 113 has given back the disk ownership to the other node 10. The data access to the memory device 20 may be performed for each of the volumes.

Figure 3:
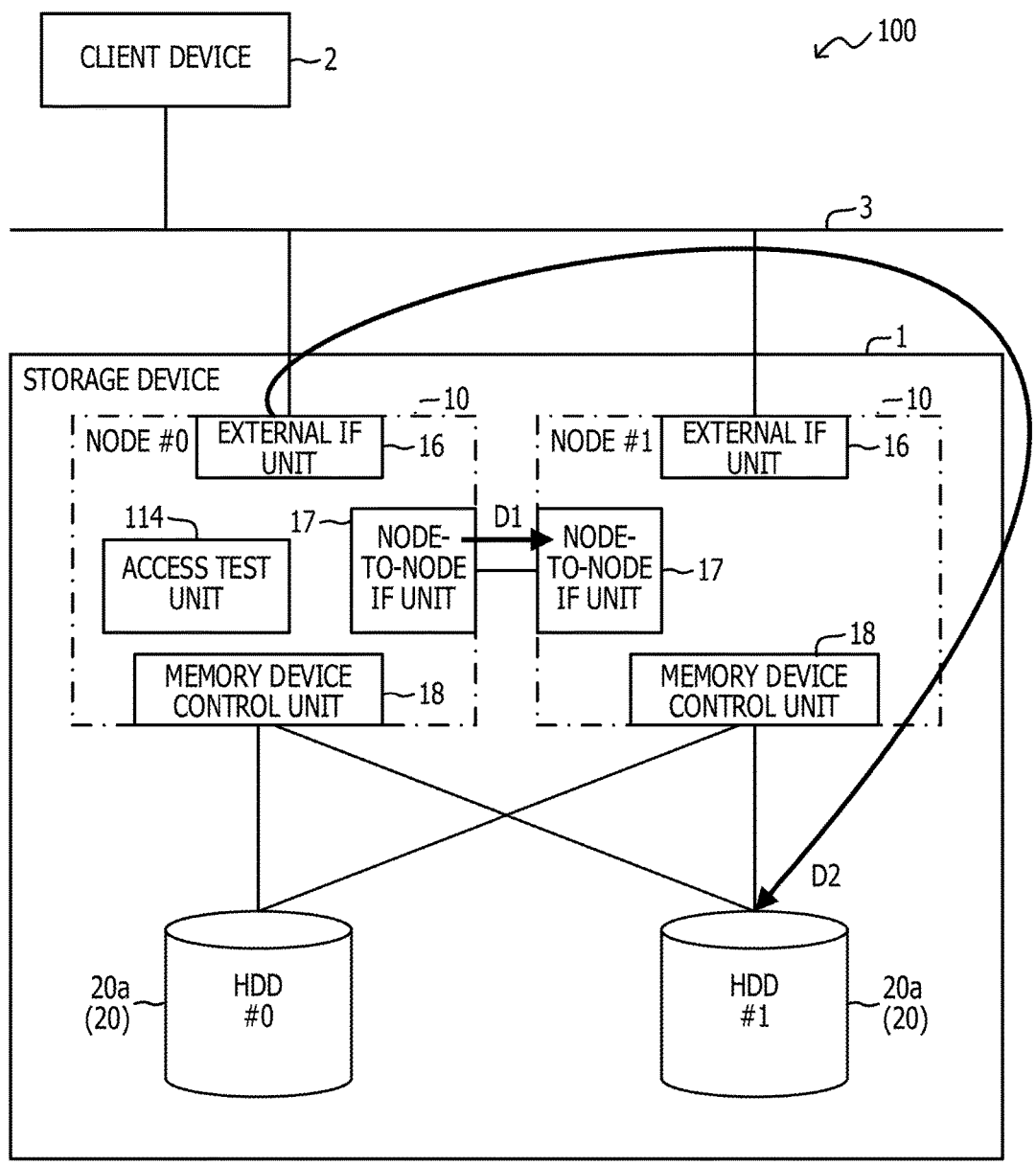
FIG. 3 illustrates an example of an access test.

When a failure has been detected during the access test, the access test unit 114 interrupts the suspend processing of the entire cluster, and for example, notifies the administrator of the storage system 100 of the error through the client device 2. FIG. 3 illustrates an example of an access test.

The access test for the memory device 20 is conducted by the access test unit 114 using the following pieces of processing (i) to (iv). A storage system 100 illustrated in FIG. 3 may have a function configuration similar to the storage system 100 illustrated in FIG. 1. A storage device 1 illustrated in FIG. 3 includes two HDDs (HDDs #0 and #1) 20a as the HDDs 20a illustrated in FIG. 1, and each of the nodes #0 and #1 is coupled to the HDDs 20a. In FIG. 3, some of the function configurations included in the node 10, for example, the back-up HDD 20b and the SSD 20c may be omitted for the sake of simplicity.

Hereinafter, when a single HDD is identified from among the plurality of HDDs, the HDD is referred to as "HDD #0" or "HDD #1", but a certain HDD is referred to as "HDD 20a". In FIG. 3, the node #0 may own the disk ownership of the HDD #0, and the node #1 may own the disk ownership of the HDD #1. In FIG. 3, the access test unit 114 of the node #0 conducts an access test for the HDD #1 the disk ownership of which is owned by the node #1.

(i) The access test unit 114 of the node #0 confirms that information identical to the volume information that has been obtained by the obtaining unit 112 is stored in the other node 10, through the node-to-node IF units 17 (see symbol D1). (ii) The access test unit 114 of the node #0 mounts each of the volumes of the HDD #1, based on the protocol and the volume name of the volume information that has been obtained by the obtaining unit 112, through the external IF unit 16, the LAN 3, and the node #1 (see symbol D2).

(iii) The access test unit 114 of the node #0 creates a file having a size 0 for each of the mounted volumes of the HDD #1, based on the volume information that has been obtained by the obtaining unit 112, through the external IF unit 16, the LAN 3, and the node #1. After that, the access test unit 114 of the node #0 deletes the created file (see symbol D2).

(iv) The access test unit 114 of the node #0 unmounts each of the mounted volumes of the HDD #1 (see symbol D2). The access test for the HDD #1 by the access test unit 114 of the node #0 (see symbol D2) is conducted using a path similar to the path in the normal operation that passes through the node #1 and the LAN 3, which are used for the host I/O, from the client device 2 to the HDD #1. As a result, the access test unit 114 of the node #0 conducts the access test for the HDD #1, based on the disk ownership owned by the node #1.

Figure 4:
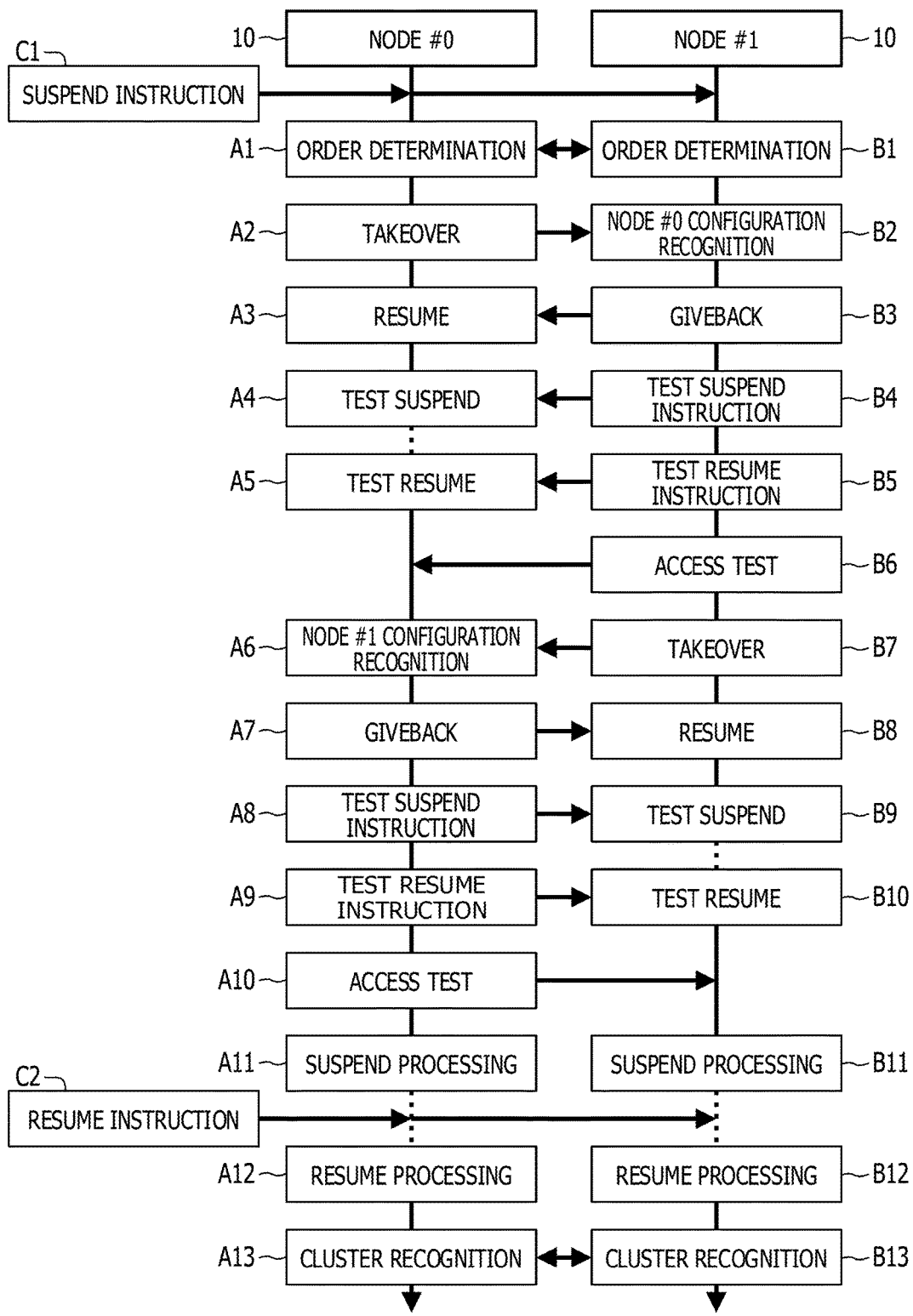
FIG. 4 illustrates an example of a power source control processing.

FIG. 4 illustrates an example of a power source control processing. Processing of Operations A1 to A13 indicates processing by the node #0. Processing of Operations B1 to B13 indicates processing by the node #1. Processing of Operations C1 and C2 indicates processing by the client device 2.

In FIG. 4, power source control processing of the storage system 100 having the cluster configuration of the Active-Active state illustrated in FIG. 1 is illustrated. The administrator of the storage system 100 issues suspend instructions to the nodes #0 and #1, for example, through the client device 2 (Operation C1). The order determination units 111 of the nodes #0 and #1 determine the order of the nodes 10 for which the test suspend processing is executed (Operation A1 and B1). In FIG. 4, the order determination units 111 of the nodes #0 and #1 may determine that the node #0 executes the test suspend processing first, and the node #1 executes the test suspend processing second.

The obtaining unit 112 of the node #1 issues an obtaining request of the disk ownership and the volume information of the memory device 20 owned by the node #0, to the node #0 for which the test suspend processing has been determined to be executed first by the order determination units 111. The response unit 117 of the node #0 executes the takeover processing for the node #1 (Operation A2). For example, the response unit 117 of the node #0 takes over the disk ownership and the volume information of the memory device 20 owned by the node #0 to the node #1.

The obtaining unit 112 of the node #1 recognizes a configuration of the memory device 20 the disk ownership of which is owned by the node #0, based on the disk ownership and the volume information that have been taken over from the node #0 (Operation B2). Due to Operations A2 and B2, the node #0 becomes a self-blockage state. The giveback unit 113 of the node #1 executes the giveback processing on the node #0 (Operation B3). For example, the giveback unit 113 of the node #1 gives back the disk ownership that has been obtained by the obtaining unit 112, to the node #0 after confirming that the takeover processing from the node #0 has been completed.

The reception unit 118 of the node #0 returns to the active state by receiving the disk ownership from the node #1 (Operation A3). Due to Operations B3 and A3, the storage device 1 becomes the cluster configuration of the Active-Active state again. The suspend instruction unit 115 of the node #1 issues an execution instruction of the test suspend processing to the node #0 after the takeover processing has been completed successfully (Operation B4).

The test suspend processing unit 119 of the node #0 executes the test suspend processing, in response to the instruction from the node #1 (Operation A4). The resume instruction unit 116 of the node #1 issues an execution instruction of the test resume processing to the node #0 after the test suspend processing in the node #0 has been completed (Operation B5).

The test resume processing unit 120 of the node #0 executes the test resume processing, in response to the instruction from the node #1 (Operation A5). The access test unit 114 of the node #1 conducts an access test for the memory device 20 the disk ownership of which is owned by the node #0 after the test resume processing in the node #0 has been completed (Operation B6). In FIG. 4, the access test unit 114 of the node #1 conducts the access test for the memory device 20 the disk ownership of which is owned by the node #0 before the node #0 conducts an access test for the memory device 20 the disk ownership of which is owned by the node #1.

When the access test unit 114 of the node #1 has conducted the access test successfully, the obtaining unit 112 of the node #0 issues an obtaining request of the disk ownership and the volume information of the memory device 20 owned by the node #1, to the node #1 for which the test suspend processing has been determined to be executed second by the order determination unit 111. The response unit 117 of the node #1 executes the takeover processing for the node #0 (Operation B7). For example, the response unit 117 of the node #1 takes over the disk ownership and the volume information of the memory device 20 owned by the node #1, by the node #0.

The obtaining unit 112 of the node #0 recognizes a configuration of the memory device 20 the disk ownership of which is owned by the node #1, based on the disk ownership and the volume information that have been taken over from the node #1 (Operation A6). Due to Operations B7 and A6, the node #1 becomes the self-blockage state. The giveback unit 113 of the node #0 executes the giveback processing for the node #1 (Operation A7). For example, the giveback unit 113 of the node #0 gives back the disk ownership that has been obtained by the obtaining unit 112, to the node #1 after confirming that the takeover processing from the node #1 has been completed.

The reception unit 118 of the node #1 returns to the active state after receiving the disk ownership from the node #0 (Operation B8). Due to Operation A7 and B8, the storage device 1 becomes the cluster configuration of the Active-Active state again. The suspend instruction unit 115 of the node #0 issues an execution instruction of the test suspend processing to the node #1 after the takeover processing has been completed successfully (Operation A8).

The test suspend processing unit 119 of the node #1 executes the test suspend processing, in response to the instruction from the node #0 (Operation B9). The resume instruction unit 116 of the node #0 issues an execution instruction of the test resume processing to the node #1 after the test suspend processing in the node #1 has been completed (Operation A9).

The test resume processing unit 120 of the node #1 executes the test resume processing, in response to the instruction from the node #0 (Operation B10). The access test unit 114 of the node #0 conducts an access test for the memory device 20 the disk ownership of which is owned by the node #1 after the test resume processing in the node #1 has been completed (Operation A10). In the example of FIG. 4, the access test unit 114 of the node #0 conducts the access test for the memory device 20 the disk ownership of which is owned by the node #1 after the node #1 has conducted an access test for the memory device 20 the disk ownership of which is owned by the node #0.

When the access test unit 114 of the node #0 has conducted the access test successfully, each of the suspend processing units 121 of the nodes #0 and #1 executes the suspend processing for the own node 10 (Operations A11 and B11). The administrator of the storage system 100 issues resume instructions to the nodes #0 and #1, for example, through the client device 2 (Operation C2).

Each of the resume processing units 122 of the nodes #0 and #1 executes the resume processing for the own node 10, in response to the resume instruction from the administrator (Operations A12 and B12). Each of the cluster recognition unit 123 of the nodes #0 and #1 confirms that the storage device 1 corresponds to the cluster configuration of the Active-Active state after the resume processing units 122 of the nodes #0 and #1 have completed the resume processing (Operations A13 and B13).

The node (control device) 10 may achieve, for example, the following operation effect. When a suspend instruction to the other node 10 occurs, the obtaining unit 112 obtains the disk ownership and the volume information of the memory device 20 owned by the other node 10, from the other node 10. The giveback unit 113 gives back the disk ownership to the other node 10 after the obtaining unit 112 has obtained the disk ownership and the volume information. The access test unit 114 conducts an access test for the memory device 20 after the giveback unit 113 has given back the disk ownership to the other node 10.

When an operation suspend instruction to the own node 10 occurs, the response unit 117 responds the disk ownership and the volume information of the memory device 20 owned by the own node 10, to the other node 10 for an obtaining request from the other node 10. The reception unit 118 receives the disk ownership that has given back from the other node 10 after the response unit 117 has responded the disk ownership and the volume information. The other node 10 conducts an access test for the memory device 20 after the reception unit 118 has received the disk ownership.

In addition, after one of the nodes 10 has conducted an access test for the memory device 20 of the other node 10, and has confirmed that the access to the memory device 20 has been performed successfully, the suspend processing (operation suspension) is executed. As a result, the reliability at the time of resume processing (operation resumption) in the node 10 may be improved. For example, the occurrence in which the resume processing has not been completed successfully due to the execution of the suspend processing in the abnormal state may be reduced.

After the giveback unit 113 has given back the disk ownership to the other node 10, the suspend instruction unit 115 issues a test operation suspend instruction to the other node 10. After the suspend instruction unit 115 has completed the test operation suspend processing for the other node 10, in response to the test operation suspend instruction, the resume instruction unit 116 issues a test operation resume instruction to the other node 10. The access test unit 114 conducts an access test for the memory device 20 after the resume instruction unit 116 has completed the test operation resume processing for the other node 10, in response to the test operation resume instruction.

The test suspend processing unit 119 suspends some of functions included in the own node 10, in response to the test operation suspend instruction from the other node 10 after the reception unit 118 has received the disk ownership. The test resume processing unit 120 resumes the operations of the functions, in response to the test operation resume instruction from the other node 10 after the test suspend processing unit 119 has suspended the operations of the functions. In addition, the other node 10 conducts an access test for the memory device 20 after the test resume processing unit 120 has resumed the operations of the functions.

The test suspend processing and the access test are executed in stages. Therefore, the occurrence in which the resume processing has not been completed successfully due to the execution of the suspend processing while the entire storage device 1 is in the abnormal state may be reduced. The access test unit 114 conducts an access test for the memory device 20 by confirming that information that is substantially the same as the volume information that has been obtained by the obtaining unit 112 is stored in the other node 10.

The access test unit 114 conducts an access test for the memory device 20 by creating and deleting a file for the memory device 20, based on the volume information that has been obtained by the obtaining unit 112. Therefore, after the resume processing has been executed, it may be guaranteed that the node 10 accesses the memory device 20. After the takeover processing, the giveback processing, the test suspend processing, and the test resume processing have been executed in advance, an access test which is close to the normal operation is conducted. Therefore, the occurrence in which the suspend processing is executed while the node 10 is in the abnormal state may be reduced. The power conservation may be performed in the state in which the reliability of the storage device 1 is kept.

The access test unit 114 conducts an access test for the memory device 20 before or after the other node 10 conducts an access test for the memory device 20. Therefore, the occurrence in which both of the two nodes 10 are not allowed to access the memory device 20 may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device comprising:
   a memory which stores a program; and
   a processor coupled to the memory and provided in the control device having a second control right that is an exclusive right to control a second memory device, the processor performs, based on the program, operations of:
      receiving, along with another control device having a first control right that is an exclusive right to control a first memory device, a suspend instruction to instruct a storage system including the control device and the another control device to become a suspend state corresponding to a power conservation state;
      obtaining the first control right and first memory device information on a configuration of the first memory device, from the another control device after receiving the suspend instruction at the control device and the another control device;
      giving back the first control right to the another control device after obtaining the first control right and the first memory device information;
      issuing a first test suspend instruction to the another control device such that the another control device executes a first test suspend processing to become the suspend state;
      issuing a first test resume instruction to the another control device such that the another control device executes a first test resume processing to resume from the suspend state after executing the first test suspend processing;
      conducting a first access test to the first memory device after the first test resume processing based on the first memory device information;
      outputting the second control right and second memory device information on a configuration of the second memory device to the another control device;

subjecting a second test suspend processing to become the suspend state based on a second test suspend instruction which is issued from the another control device;

subjecting a second test resume processing to resume from the suspend state based on a second test resume instruction which is issued from the another control device;

subjecting a second access test to the second memory device from the another control device; and executing, along with another control device, a suspend processing based on the suspend instruction after completing the first access test and the second access test such that the control device and the another control device become the suspend state.

2. The control device according to claim 1, wherein the operations include:

issuing the first test suspend instruction to the another control device after giving back the first control right;

issuing the first test resume instruction to the another control device after completing the first test suspend processing for the another control device; and conducting the first access test after completing the first test resume processing for the another control device.

3. The control device according to claim 1, wherein the operations include conducting the first access test by confirming whether information that is substantially identical to the first memory device information is stored in the another control device.

4. The control device according to claim 1, wherein the operations include conducting the first access test by creating and deleting a file for the first memory device based on the first memory device information.

5. The control device according to claim 1, wherein the operations include:

responding to an obtaining request from the another control device with the second control right and the second memory device information; and receiving the second control right which is given back from the another control device after responding the obtaining request.

6. The control device according to claim 5, wherein the operations include:

executing the second test suspend processing which suspends operations of at least part of function of the control device, in response to the second test suspend instruction from the another control device after receiving the second control right; and executing the second test resume processing which resumes the operation of the at least part of the function, in response to the second test resume instruction from the another control device after the second test suspend processing.

7. The control device according to claim 5, wherein the first access test is conducted before or after the second access test for the second memory device is conducted by the another control device.

8. The control device according to claim 7, wherein the operations include:

suspending an operation of at least part of function of the control device after completing the first access test and the second access test; and resuming the operation of the at least part of the function when an operation resume instruction to the control device occurs after suspending the operation of the at least part of the function.

* * * * *